United States Patent [19]

Weir et al.

[11] Patent Number: 4,931,413

[45] Date of Patent: Jun. 5, 1990

[54] GLASS CERAMIC PRECURSOR COMPOSITIONS CONTAINING TITANIUM DIBORIDE

[75] Inventors: Richard L. Weir, Mahopac; Jeannine A. Pearsall, Pomona, both of N.Y.

[73] Assignee: Toyota Jidosha Kabushiki Kaisha, Aichi, Japan

[21] Appl. No.: 220,793

[22] PCT Filed: Nov. 3, 1986

[86] PCT No.: PCT/US86/02365

§ 371 Date: Jul. 5, 1988

§ 102(e) Date: Jul. 5, 1988

[87] PCT Pub. No.: WO88/03519

PCT Pub. Date: May 19, 1988

[51] Int. Cl.$^5$ ............................................... C03C 6/04
[52] U.S. Cl. ................................................ 501/31; 501/2; 501/4; 501/5; 501/92; 501/96; 501/27; 106/286.4; 106/287.1; 106/287.13
[58] Field of Search ................... 501/2, 4, 5, 92, 96, 501/27, 31; 106/286.4, 287.1, 287.13

[56] References Cited

U.S. PATENT DOCUMENTS

| | | |
|---|---|---|
| 3,458,344 | 7/1969 | Little et al. ................. 501/5 X |
| 3,775,137 | 11/1973 | Clougherty et al. |
| 3,852,107 | 12/1974 | Lorkin et al. ............... 501/96 X |
| 3,859,399 | 1/1975 | Bailey et al. |
| 3,964,924 | 6/1976 | Kurzeja ....................... 106/286.4 |
| 4,017,426 | 4/1977 | Carbonnel et al. .......... 501/96 X |
| 4,076,506 | 2/1978 | Valdsaar. |
| 4,132,534 | 1/1979 | Valdsaar. |
| 4,279,654 | 7/1981 | Yajima et al. ............... 501/2 X |
| 4,555,358 | 11/1985 | Matsushita et al. ......... 501/92 X |
| 4,559,270 | 12/1985 | Sara ............................. 501/5 X |
| 4,588,700 | 5/1986 | Reven .......................... 501/5 X |
| 4,668,298 | 5/1987 | Funahashi et al. .......... 501/92 X |

FOREIGN PATENT DOCUMENTS

| | | |
|---|---|---|
| 60-161467 | 8/1985 | Japan. |
| 61-26570 | 2/1986 | Japan. |
| 0590276 | 1/1978 | U.S.S.R. ...................... 106/286.4 |

*Primary Examiner*—Karl Group
*Attorney, Agent, or Firm*—Oliff & Berridge

[57] ABSTRACT

Glass ceramic precursor compositions comprise from about 15 to about 75 percent by weight of titanium diboride and from about 10 to about 85 percent by weight of a silica compound, such as colloidal silica. The glass ceramic precursor compositions may also contain an amount up to about 60 percent by weight of an intemetallic compound, such as silicon carbide. Upon firing of the precursor compositions, glass ceramic materials are formed which are useful at high temperatures and in harsh environments as sealants, as protective coatings or as articles of manufacture.

5 Claims, No Drawings

GLASS CERAMIC PRECURSOR COMPOSITIONS CONTAINING TITANIUM DIBORIDE

BACKGROUND OF THE INVENTION

The present invention relates to glass ceramic precursor compositions, and more particularly to glass ceramic precursor compositions containing titanium diboride which upon firing form glass ceramic materials that are useful, for example, as high temperature resistant protective coatings on a substrate.

Many materials which have usable strengths at elevated temperatures and under adverse conditions decompose when exposed to harsh environments. For example, graphites will oxidize to carbon dioxide and ferrous metals will scale. Moreover, most materials will react with their environments at higher temperatures. Efforts have been made to prevent adhesion or reactions at higher temperatures by altering the surface quality of degradable materials which otherwise have desirable properties. For example, high temperature resistant protective coatings are known which serve to extend the life of various materials, including graphite. These coatings are fused to the surface of the host material at high temperature and controlled pressure and, as such, are costly and require expensive coating and fabrication equipment.

Protective coatings which are not fused have been developed which function to some extent at relatively moderate temperatures. These coatings are intended to insulate or encapsulate the surface of the substrate or host material, such as graphite and construction materials, in such a way as to prevent the surface from reacting adversely in a harsh environment, and thereby extending the usable life of such materials particularly at elevated temperatures. Such coatings, as for example, silicon carbide paint specifically designed as a graphite electrode coating, are extremely brittle even at relatively low temperatures and are otherwise unsatisfactory. Another protective coating which has been employed in an effort to extend the life of electrodes is disclosed in U.S. Pat. No. 4,487,804 and uses a silica-phosphorous glass composition modified with titanium dioxide and no boron component. Relatively low percentages of titanium diboride have been used to form protective coatings for steel, but only in combination with chromium oxide and titanium dioxide.

Titanium diboride has also been used in the past with graphite electrodes, but not as a graphite protective coating. Joo' et al., in their U.S. Pat. No. 4,439,382, describe a process for manufacturing a graphite-titanium diboride composite useful as a cathodic element to provide improved electrical efficiency over prior amorphous carbon and semi-graphite cathodes. While corrosion of a cathode element is improved, the life of the cathode is not significantly extended.

Other relevant prior art coating compositions include a variety of high temperature resistant coatings primarily based upon aqueous solutions of metal silicates, such as water glass, aqueous solutions of phosphates including phosphoric acid and metal salts of the acid, and various tar and graphite mixtures to form an additional layer of carbon on graphite substrates. Some coatings have been applied in a sintering or pressing fashion forming a hermetic barrier layer. Solvent systems have several disadvantages due in substantial measure to the porosity which inevitably results as the solvent leaves the system and permits air to diffuse to the substrate. As an added drawback, the sintered type coatings require extensive equipment and design considerations as they substantially alter the finished product and manufacturing techniques.

It is, accordingly, an object of this invention to provide a coating that will insulate or encapsulate the surface of a substrate or host material to form a protective barrier in harsh environments.

It is also an object of this invention is to provide a coating that will lengthen the usable life of various materials at elevated temperatures.

It is another object of this invention to provide a hermetic sealant or binder, particularly on that will seal glass to metal components.

It is yet another object of this invention to provide a material that is used to manufacture parts of articles.

SUMMARY OF THE INVENTION

The present invention relates to glass ceramic precursor compositions comprising from about 15 to about 75 percent by weight of titanium diboride and from about 10 to about 85 percent by weight of a silica compound, such as colloidal silica. These glass ceramic precursor compositions upon firing form glass ceramic materials suitable for use at high temperatures and in chemically harsh environments as protective coatings, hermetic sealants or simply as articles of manufacture. In a preferred embodiment, the compositions of the invention may further comprise an intermetallic compound in an amount up to about 60 percent by weight, preferably from about 5 to 30 percent by weight. The intermetallic compound may be selected from any material which, when reacted with oxygen, can supply one of the primary ions of silicon, titanium or boron, such as silicon carbide, boron carbide and titanium carbide.

The titanium diboride ($TiB_2$) component is present in an amount of from about 15 to about 75 percent by weight, but is preferably present in an amount ranging from about 25 to about 50 percent by weight. The titanium diboride should be relatively free of impurities, such as cubic phase impurities and is preferably characterized by a fine powder or mixture of powders which improves the rheology and density of the coating.

The titanium diboride provides a source in the mixture for boron to be supplied into the silicates to form varying degrees of boro-silicate glasses. The titanium oxidizes to varying degrees to generate nucleation points for crystal growth in the boro-silicate glasses. It is believed that the titanium enters into the silicate mass as part of a crystal structure. Introducing these boron and titanium components into the silicates in this manner evidently causes high temperature glass to form in situ and generate a hermetic skin supported first by the powder silicate mass. The composition of this healing skin or layer alters with temperature and time. The diffusing atmosphere causes this reaction to proceed to thicken the skin and increase its thermal resistance.

The silica compound is present in an amount of from about 10 to about 85 percent by weight, and preferably is present in an amount ranging from about 30 to 50 percent by weight. The silica compound of choice is colloidal silica, such as LUDOX-TM (Dupont) aqueous colloidal silica, but may be comprised of extremely fine silica flours, fumed silica, or a suitable reaction product of selective metal silicates. Where the selected silica compound does not incorporate an adequate vehicle to form a coating fluid, sufficient liquid to achieve a coatable admixture must be added. For example, where a fumed silica, such as Cabosil (Cabot), is used, sufficient water is added to prepare a coating composition according to the invention.

The silicates present form the basis for the high temperature resistant glass/crystal materials of the invention. In the extreme close contact and presence of the other reaction components, the silicates begin to combine to form a solution. As the process is initiated, the fluid parts of the silicate glass rapidly dissolve more silicate to incorporate higher quantities of the titanium diboride which is reacting in air to form oxides. The boro-silicates, as a semi-fluid, preclude further gas diffusion. Without the presence of air, more silicates continue to be incorporated into the mass raising its melting point. Thus, a glass material is formed with high temperature properties keyed to the temperature of formation. If the mass is subsequently heated to a higher temperature, the reaction continues so as to incorporate more silicates and the titanium diboride components.

The optional intermetallic compound component functions to provide a secondary source of oxides on the surface of the metal salt particles as they are incorporated into the bonding matrix. The metal salt particles act to alter the physical properties of the mass by both changing its relative hardness, abrasion resistance, and thermal expansion. The metal salts, such as silicon carbide, titanium carbide or boron carbide, can be mixed to alter the matrix while still exhibiting bonding and providing a homogenous matrix. The coatings of the invention are capable of resisting abrasion and thermal shock due to their hard crystalline nature which is improved by the addition of the hard metal salt aggregate, such as silicon carbide.

The host material or substrate may be any material capable of operating at elevated temperatures which requires protective coating, such as graphite, carbon, ceramic, and metals, such as low carbon steel.

The compositions according to the invention may also contain fillers and other additives, including silicon, titanium, boron, alumina, silica, cobalt oxide and any other refractory ceramic fine powder, to alter the physical properties of the mass as desired or required by the anticipated end use.

As a glass ceramic coating, the invention compositions can be applied by painting, spraying or brushing onto surfaces of host materials. As is generally known in the art, the coated article is dried, normally for about an hour, placed in a cool kiln or furnace, and fired up at relatively low temperatures ranging from about 1100° F. to about 2000° F. for a sufficient time in air, such that a protective coating is formed at relatively low cost.

Coating compositions prepared in accordance with the present invention are extremely advantageous because they can be readily applied to the surface of a wide variety of host materials, e.g. by dip-coating, roller-coating, brushing, spraying or painting, as well as spatulated and powder application. Moreover, expensive equipment is not required to fuse the coating onto the surfaces of host materials.

DETAILED DESCRIPTION OF PREFERRED GLASS CERAMIC PRECURSOR COMPOSITIONS ACCORDING TO THE INVENTION

Compositions according to the invention are best formulated as follows:
(a) as a coating composition:

|  | #1 | #2 | #3 |
| --- | --- | --- | --- |
| Titanium Diboride | 35 gm | 45 gm | 50 gm |
| Colloidal Silica | 40 gm | 50 gm | 50 gm |
| Silicon Carbide | 25 gm | 15 gm | — |

(b) as a hermetic sealant:

|  | #1 | #2 | #3 |
| --- | --- | --- | --- |
| Titanium Diboride | 35 gm | 35 gm | 35 gm |
| Colloidal Silica | 35 gm | 30 gm | 40 gm |
| Silicon Carbide | 30 gm | 35 gm | 25 gm |

Accordingly, the most preferable composition as a coating as well as a sealant is made using the formula:

| Titanium Diboride | 35 gm |
| --- | --- |
| Colloidal Silica | 40 gm |
| Silicon Carbide | 25 gm |

An article of manufacture using this formula is made as follows: A layer coating of the formulation approximately 1/16 inch thick × 8 inch square was spread on a sheet of aluminum foil and placed in an oven at 150° F. for five hours. The dried matrix was then removed from the foil, placed in a kiln and fired to 1200° F., and thereafter exposing the square to this temperature for 16 hours allowing the reaction to take place. The square was then cooled and ground to a −100 mesh powder. The powder was easily formed under the pressure into a ½ inch OD × ½ inch long slug. The slug was then placed in a kiln at room temperature and fired to 2300° F. holding at this temperature for two hours. When removed, the slug was found to have high strength and surface hardness.

In preparing a glass ceramic precursor composition in accordance with the invention, particularly as a coating composition, each component should have a particle size of about 80 mesh and smaller. Preferably, the particle size should be −200 mesh for a coating composition. Particle size is the key to the generation of a uniform mass because it provides for even distribution of the ions generated and, as such, an adequate number of individual reaction sites. The uniform generation of the coating enhances the initial sealing as well as permits further reaction on subsequent heating.

The compositions according to the invention permit relatively thin coatings which are capable of forming a protective barrier having the desired hardness and strength. Preferably, the coatings should have a thickness greater than about 10 mils.

Where the desired end use of a coating article will be at temperatures between about 900°–1100° F., care must be exercised in the firing cycle. If the firing temperature is held at the range of 900° to 1100° F. for more than 20 minutes, the coating will swell and pop off the host material. The 900°–1100° F. temperature range must be passed quickly, i.e., within about 20 minutes, to eliminate this problem. Thereafter, the article is fired at a temperature above about 1400° F. to enable use at any lower temperature.

In preparing coating compositions according to the invention for application to steel, care is taken to prevent the coating from popping off the steel upon cooling. Popping off of the coating is due to the vast difference in the expansion (upon heating) and contraction (upon cooling) rates between steel and glass ceramic. This problem is avoided by continuous use at elevated temperatures and minimized by the addition of a metal carbide, such as silicon carbide.

The invention may be further illustrated by the following examples:

EXAMPLE 1

A coating composition according to the invention was prepared containing 35% by weight of titanium diboride, 40% by weight of colloidal silica and 25% by weight of silicon carbide. The components were mixed with a spatula into a homogeneous mass using 35% $TiB_2$, 40% colloidal silica and 25% silicon carbide. Pieces of graphite $\frac{1}{4}"\times2"\times2"$ were then prepared by sanding off any sharp edges to lessen the chance of pin holes or cracking upon coating. Six pieces of graphite were coated (approximately 10 mils thick) with the invention $TiB_2$ formula and six similar pieces with a commercially available silicon carbide (SiC) coating. All twelve coated pieces of graphite were dried in air at 200° F. for 1 hour. The weight of each piece was recorded. As a control three pieces of uncoated graphite were weighed and recorded. All fifteen pieces were placed in a kiln at room temperature and fired to 1800° F. in air and held for a period of 1½ hours. The pieces were removed and cooled to room temperature and reweighed. This heat-weight loss testing cycle procedure was then repeated over a 10 hour period at the 1800° F. temperature.

The uncoated pieces of graphite lost 50% of their weight due to oxidation in 1½ hours. The SiC coated pieces of graphite lost 30% of their weight due to the graphite oxidizing under the coating in 1½ hours. The graphite pieces coated with the invention $TiB_2$ coating were essentially unchanged in weight after 1½ hours. After 3 hours, the uncoated graphite was completely oxidized, leaving a pile of ashes in the kiln; the SiC coated graphite pieces all swelled with some cracking (weight loss of the graphite was 70%); and the invention $TiB_2$ coated graphite pieces remained constant in weight. After 4½ hours, the SiC coated graphite pieces were completely oxidized (cracked, blistered, and swollen empty shells remained) and the invention $TiB_2$ coated graphite pieces had no change in weight for the entire 10 hour period.

EXAMPLE 2

A coating composition according to the invention was prepared by the procedure set forth in Example 1, except that it contained no silicon carbide and equal amounts of titanium diboride and colloidal silica. The composition was mixed with a spatula to a homogeneous mass. The graphite substrates were prepared as in Example 1 with a 10 ml. coating thickness. Samples were dried in air at 200° C. for one hour, cooled and weighted. The coated pieces were fired to 1800° F. in air and held at that temperature for 16 hours.

There was a glaze formed and a 0.5% weight gain due to the presence of oxygen in the final coat.

EXAMPLE 3

Another coating composition according to the invention was prepared by the procedure set forth in Example 1, but containing 25% by weight of silicon carbide from a second source, 35% by weight of titanium diboride and 40% by weight of colloidal silica. Samples were tested as in Example 1 with essentially the same results.

EXAMPLE 4

Six coating compositions were prepared according to the invention by the procedures of Example 1 which compositions contained no intermetallic compound compound, and varying amounts of titanium diboride and colloidal silica.

|  | A | B | C | D | E | F |
|---|---|---|---|---|---|---|
| $TiB_2$ | 20 gm | 30 gm | 40 gm | 60 gm | 70 gm | 75 gm |
| Colloial Silica | 80 gm | 70 gm | 60 gm | 40 gm | 30 gm | 25 gm |

Graphite coated substrates were prepared as in Example 1 and all samples were held for 8 hours at 1800° F. The results obtained are as follows:
 (a) Weight loss of 14% due to oxidation.
 (b) Weight loss of 8% due to oxidation.
 (c) Slight weight gain of 0.4%; glaze formed.
 (d) Slight weight gain of 0.5%; glaze formed.
 (e) Slight weight gain of 0.5%; glaze formed.
 (f) Slight weight gain of 0.4%; glaze formed.

Although the invention has been described with a certain degree of particularity, it is understood that the present disclosure has been made only by way of example and that numerous changes in details thereof may be resorted to without departing from the scope of the invention as hereinafter claimed.

We claim:

1. A glass ceramic precursor composition consisting essentially of from about 35 to about 75 percent by weight of titanium diboride and from about 25 to about 60 percent by weight of colloidal silica.

2. A composition according to claim 1 consisting essentially of an amount up to about 35 percent by weight of an intermetallic compound selected from the group consisting of silicon carbide, boron carbide and titanium carbide.

3. A composition according to claim 1 wherein the colloidal silica is present in an amount ranging from about 30 to about 50 percent by weight.

4. A composition according to claim 2 wherein the intermetallic compound is present in an amount ranging from 5 to 30 percent by weight.

5. A glass ceramic precursor composition consisting essentially of about 35 percent by weight titanium diboride, about 40 percent colloidal silica and about 25 percent silicon carbide, all by weight, said composition capable of forming a protective coating or sealant enabling a substrate to be used at high temperatures without rapid oxidation.

* * * * *

UNITED STATES PATENT AND TRADEMARK OFFICE
CERTIFICATE OF CORRECTION

PATENT NO. : 4,931,413

DATED : June 5, 1990

INVENTOR(S) : Richard L. Weir; Jeannine A. Pearsall

It is certified that error appears in the above-identified patent and that said Letters Patent is hereby corrected as shown below:

Cover page, item [73], Assignee, "Toyota Jidosha Kabushiki Kaisha, Aichi, Japan" should read -- Aremco Products, Inc., Ossining, New York -- ;

Cover page, Attorney, Agent or Firm, "Oliff & Berridge" should read -- White & Case -- ;

Col. 3, line 24, "metal salt" should read -- intermetallic compound -- ;

Col. 3, line 33, "metal salt" should read -- intermetallic compound -- ;

Col. 5, line 58, "200°C." should read -- 200°F -- .

Signed and Sealed this

Twenty-first Day of January, 1992

Attest:

HARRY F. MANBECK, JR.

*Attesting Officer*  *Commissioner of Patents and Trademarks*